May 1, 1962  R. CHAVAND  3,031,894
BELT GEARINGS
Filed Dec. 29, 1959

INVENTOR.
René Chavand
BY Alexander McDowell
attorneys

United States Patent Office 3,031,894
Patented May 1, 1962

3,031,894
BELT GEARINGS
René Chavand, 53 Rue d'Anvers, Lyon, France
Filed Dec. 29, 1959, Ser. No. 862,712
Claims priority, application France Jan. 9, 1959
3 Claims. (Cl. 74—216.5)

It is known that in a conventional belt gearing comprising two pulleys 1 and 2 (FIG. 1) connected by a belt 3, the tangential or tractive force transmitted from the periphery of the driving pulley such as 1 to the periphery of the driven pulley 2 is:

(I) $$F = T_1 - T_2$$

$T_1$ being the tension in the upper driving portion of the belt and $T_2$ the tension of the lower idle or return portion thereof.

Now when the gearing is at rest, the tension is substantially the same in the upper and in the lower portion and since the belt behaves as a longitudinally elastic member this tension at rest $T_0$ is such that:

(II) $$2T_0 = T_1 + T_2$$

When the gearing reaches the limit of its power transmitting capacity, i.e. just before the belt slips, the tensions in the driving length and in the idle length are such that:

(III) $$\frac{T_1}{T_2} = e^{f\theta}$$

$f$ being the coefficient of friction of the belt on the pulleys and $\theta$ the winding angle of the belt on the pulley on which the belt will slip (practically speaking the smaller pulley 1).

In any case the tension in the driving portion of the belt should not reach the rupturing limit S of the belt, taking into account the safety coefficient $c$ which has been selected.

(IV) $$T_1 < \frac{S}{c}$$

The above formulae limit the power which a belt made of a given material may transmit between two pulleys such as 1 and 2 (of course for a predetermined rotational speed of the driving pulley).

A first solution which has been proposed for raising this limit consists in the use of compound belts comprising a tractive band made from a material having a high tensile strength (S very high in Formula IV), as for instance a synthetic resin of the group of polyamides, lined with a material having a high frictional coefficient ($f$ high in Formula III) such as chrome-leather. The transmission thus realized still follows the above formulae, but the combination of the two substances which form the belt permits of obtaining more favourable values for the respective coefficients $f$ and S. Such compound belts are widely used in practice and are generally found satisfactory. But the improvement obtainable with respect to the conventional belts made of a single material is relatively limited.

Another solution consists in providing belt tensioning rollers or like means which act on the idle portion of the belt to increase the winding angle $\theta$ on the smaller pulley 1 and also to maintain the said idle portion under a sufficient tension notwithstanding the elongation of the driving portion, even at full load. From a theoretical point of view this solution should lead to remarkable results, but in actual practice such tensioning devices complicate the gearing, lower its efficiency in a substantial manner, suppress the possibility of inverting or reversing the transmission (the idle portion can no more become the driving portion of the belt) and also considerably reduce the useful life of the belt.

It has further been proposed to dispose on a transmission belt, or primary belt, another belt, or secondary belt, adapted to maintain the primary belt applied against the periphery of the pulleys with a sufficient pressure for avoiding slippage, irrespective of the tension of the idle portion of the primary belt. With such an arrangement the transmission no more follows Formula III as far as the primary belt is concerned and therefore the tension of the idle portion thereof may be very small or even zero in operation, whereby the tension of the driving portion may be fully used for transmitting the tractive effort, as this results from Formula I, if $T_2$ is made equal to zero. But in practice things are not so simple. The secondary belt, stretched on the primary belt, is submitted to the elongations and contractions of the latter and therefore acts itself as a conventional transmission belt, i.e. it has a driving portion wherein the tension is higher in operation than at rest, and an idle portion wherein the tension in operation is lower than at rest, as demonstrated by Formula I. It results therefrom that the tension at rest of the secondary belt should be kept moderate for avoiding an excessive tension $T_1$ in the driving portion thereof during operation (see Formula IV); this of course limits in a considerable manner the pressure which the secondary belt may apply on the primary belt to prevent slippage thereof. Also, the secondary belt follows Formula III, which means that when in operation the tension in the idle or return portion thereof falls below a certain limit (owing to the increase of the tractive effort transmitted by the driving portion) the said secondary belt slips on the primary belt, thus causing a substantial loss of power, generating heat on the interfacial sides of both belts and considerably reducing the useful life of the gearing.

It has been attempted to avoid these inconveniences by using a primary belt made of a material having a high modulus of elasticity, i.e. a material which has a small elastic elongation under a tensile force and a secondary belt made of a material having a low modulus of elasticity, i.e. which has a relatively important elastic elongation under a tensile force. With such an arrangement the elongation of the driving portion of the primary belt is small and this small elongation transmitted to the driving portion of the secondary belt only causes a small increase of the tension of the said last-named driving portion. In other words the secondary belt only transmits a very small amount of the tractive effort. Unfortunately the materials available for making transmission belts fail to afford these characteristics of very high and very low modulus of elasticity and therefore this solution cannot be properly carried into practice.

Another solution consists in interposing rolling elements between the primary and the secondary belt. With such an arrangement the elongations and contractions of the primary belt are no more transmitted to the secondary belt which no more transmits any amount of the tractive effort. Any slippage is prevented. But it is practically impossible to dispose rollers, needles or the like between both belts, and to retain such elements at the proper position notwithstanding the vibrations; also the facing sides of the belts cannot form adequate rolling races for metallic rolling members.

An object of the present invention is to provide a transmission of the type including a primary belt mounted on the pulleys of the transmission and a secondary belt mounted on the primary belt, which will solve in a practical manner the above-mentioned problem. In accordance with this invention the outer side of the primary belt and the inner side of the secondary belt are made of materials having a very low coefficient of mutual friction.

It will be remarked that in Formula III the coefficient of friction $f$ is a factor of the exponent. It follows therefrom that the ratio $T_1/T_2$ decreases rapidly towards unity for relatively moderate decreases of $f$. In other words with a frictional coefficient $f$ of low value, $T_1$ is practically equal to $T_2$. Applying these considerations to the secondary belt regarded as a transmission belt, it may be said that if its coefficient of friction $f$ on the primary belt is sufficiently low, its two portions will have substantially the same tension in operation, irrespective of the load transmitted by the primary belt and therefore any danger of overloading the "driving" portion of the said secondary belt will be avoided. Also the power losses due to slippage of the secondary belt on the primary belt and which are proportional to the difference $T_1-T_2$ between the tensions of the "driving" and return portions of the secondary belt will become negligible.

According to another aspect of the present invention the outer side of the primary belt and the inner side of the secondary belt are made of a low friction plastic and more particularly of a polyamide.

Figure 1:
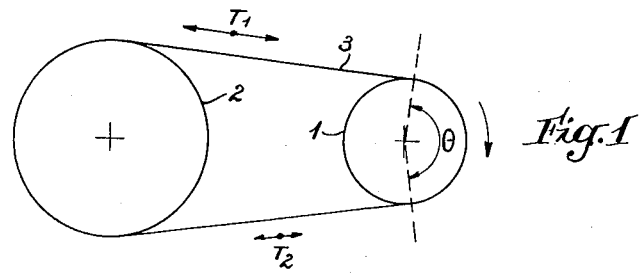
FIG. 1 is a diagram which, as above mentioned, illustrates a conventional belt gearing.
Figure 2:
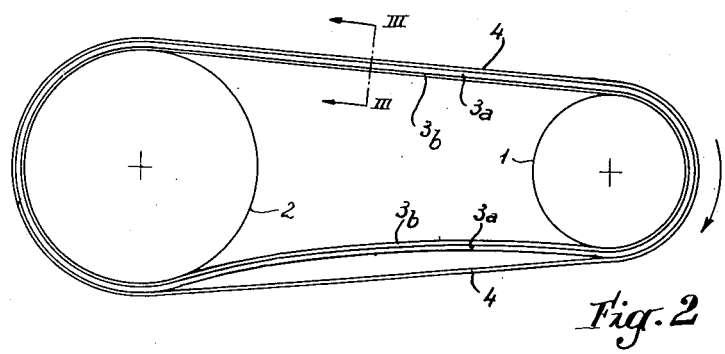
FIG. 2 shows a belt gearing according to this invention.
Figure 3:
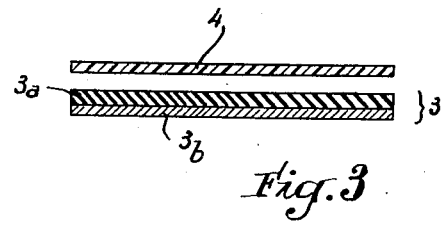
FIG. 3 is an enlarged cross section taken along III—III (FIG. 2) with the belts illustrated as spaced from each other.

Referring to FIG. 2, reference numeral 1 and 2 designate the pulleys between which power is transmitted from pulley 1 to pulley 2 by a transmission belt 3 which here serves as the primary belt. This primary belt 3 is a compound belt comprising an outer or tractive band $3a$ made of a polyamide such as nylon, and an inner or adhesive band $3b$ made of chrome leather, both bands being appropriately assembled, as for instance by means of an adhesive. This primary belt 3 is mounted on pulleys 1 and 2 under a very reduced tension at rest (the said tension even being possibly zero), and there is mounted thereon a secondary belt 4 made of a single band of an appropriate polyamide. This secondary belt 4 is under a very high tension at rest.

In operation the secondary belt 4 applies the primary belt 3 on the pulleys and thus avoids any slippage of the primary belt even if its idle or return portion is slack as shown ($T_2=0$ for this primary belt). Consequently the tension $T_1$ of the driving portion of the primary belt may be fully used for power transmission (Formula I becoming $F=T_1$). As to the secondary belt 4, owing to the low coefficient of friction $f$ between its inner side and the outer side of the primary belt 3, the tensions $T_1$ and $T_2$ of its "driving" and return portions are almost equal (in Formula III the ratio $T_1/T_2$ is almost equal to unity). Consequently its tension at rest $T_0$ may be very high without any risk of the tension $T_1$ of the "driving" portion exceeding in operation the safe limit of Formula IV. The power losses resulting from slippage of the secondary belt on the primary belt are quite low, since they are more or less proportional to the difference $T_1-T_2$ which is quite small for the secondary belt.

The secondary belt 4 should of course remain exactly disposed on the primary belt and it may be of advantage to use flanged pulleys to retain the belts laterally.

In the preceding description it has been supposed that both belts 3 and 4 were of the flat type. But it will be appreciated that the primary belt 4 could as well be of the V-type, the secondary belt still acting to press the said primary belt into engagement with respect to both pulleys 1 and 2.

I claim:

1. A belt gearing comprising a driving pulley; a driven pulley to which a tractive effort should be transmitted from the periphery of said driving pulley; a primary belt mounted on said driving and driven pulleys to transmit said tractive effort; and a secondary belt mounted under tension on said primary belt to apply same on said driving and driven pulleys without transmitting itself a substantial portion of said tractive effort, the inner side of said secondary belt and the outer side of said primary belt being in the form of substantially smooth surfaces and being made of such materials that under operative conditions the coefficient of friction of said secondary belt on said primary belt be substantially lower than the coefficient of friction of said primary belt on said driving and driven pulleys.

2. A belt gearing comprising a driving pulley; a driven pulley to which a tractive effort should be transmitted from the periphery of said driving pulley; a primary belt mounted on said driving and driven pulleys to transmit said tractive effort, said primary belt being made of a band of polyamide having a smooth unlined outer side and an inner side lined with a layer of a material having a high frictional coefficient with respect to said driving and driven pulleys; and a secondary belt mounted under tension on said primary belt to apply same on said driving and driven pulleys without transmitting itself a substantial portion of said tractive effort, said secondary belt being made of a band of polyamide with a smooth unlined inner side to directly bear on the unlined outer side of said primary belt.

3. A belt gearing comprising a driving pulley; a driven pulley to which a tractive effort should be transmitted from said driving pulley; a primary belt mounted on said driving and driven pulleys to transmit said tractive effort, said primary belt having a substantially smooth outer side made of a polyamide; and a secondary belt mounted under tension on said primary belt to apply same on said driving and driven pulleys without transmitting itself a substantial portion of said tractive effort, said secondary belt having a substantially smooth inner side made of a polyamide.

References Cited in the file of this patent

UNITED STATES PATENTS

| | | |
|---|---|---|
| 1,347,674 | Bloesinger et al. | July 27, 1920 |
| 2,008,353 | Geare | July 16, 1935 |
| 2,147,465 | Seigling | Feb. 14, 1939 |
| 2,526,324 | Bloomfield | Oct. 17, 1950 |
| 2,695,530 | Calzolori | Nov. 30, 1954 |